United States Patent [19]

Hamann

[11] E Re. 28,630

[45] Reissued Nov. 25, 1975

[54] DATA HANDLING SYSTEM WITH SCREEN MADE OF FIBER OPTIC LIGHT PIPES CONTAINING PHOTOCHROMIC MATERIAL

[75] Inventor: Omer F. Hamann, La Jolla, Calif.

[73] Assignee: Stromberg DatagraphiX, Inc., San Diego, Calif.

[22] Filed: June 19, 1974

[21] Appl. No.: 480,616

Related U.S. Patent Documents

Reissue of:

[64] Patent No.: 3,400,214
Issued: Sept. 3, 1968
Appl. No.: 392,251
Filed: Aug. 26, 1964

[52] U.S. Cl. ..... 178/7.87; 178/7.85; 178/DIG. 2; 178/DIG. 31; 315/10

[51] Int. Cl.[2] ..... H04N 5/68

[58] Field of Search ... 178/7.85, 7.86, 7.87, DIG. 2, 178/DIG. 31, 7.2; 315/10, 11; 250/199, 217 CR

[56] References Cited

UNITED STATES PATENTS

| | | | |
|---|---|---|---|
| 2,969,474 | 1/1961 | Roberts | 313/92 |
| 2,979,632 | 4/1961 | MacNeille | 313/89 |
| 3,085,469 | 4/1963 | Carlson | 178/7.86 |
| 3,124,715 | 3/1964 | Cox | 315/10 |
| 3,134,297 | 5/1964 | Carlson | 88/24 |
| 3,218,390 | 11/1965 | Bramley | 250/199 |
| 3,225,138 | 12/1965 | Montani | 178/7.2 |

OTHER PUBLICATIONS

"Research and Development," brochure by National Cash Register Co., received March 14, 1960.

In re Ludovici and Megla, 179U.S.P.Q. 84, pp. 84–88.

*Primary Examiner*—Howard W. Britton
*Attorney, Agent, or Firm*—John R. Duncan

[57] ABSTRACT

A screen for an electron discharge device wherein a target formed of a plurality of fiber optic light pipes is made of a composition including a photochromic material and is selectively subjected to ultraviolet or similar radiation so as to prevent passage of visible light through certain light pipes.

13 Claims, 2 Drawing Figures

DATA HANDLING SYSTEM WITH SCREEN MADE OF FIBER OPTIC LIGHT PIPES CONTAINING PHOTOCHROMIC MATERIAL

Matter enclosed in heavy brackets [ ] appears in the original patent but forms no part of this reissue specification; matter printed in italics indicates the additions made by reissue.

The present invention relates to data handling systems and, more particularly, to data handling systems which utilize cathode-ray type tubes for display and for data storage purposes.

So-called dark trace tubes have been employed in the past for displaying data visually, particularly where the display is to persist for a predetermined period of time. These dark trace tubes generally include a scotophor layer which is selectively bombarded with electron streams at certain incremental areas to produce dark images or patterns upon a phosphor field. These darkened incremental areas are caused by the creation of "F" centers in the thin scotophor layer. However, the penetration of the electron stream which creates these "F" centers is limited to depths in the order of only one micron for normal cathode-ray tube voltages. As a result, efficiency is low and the display has a relatively low visual contrast. In addition, the vacuum characteristics of scotophors with regard to tube life leaves something to be desired.

Accordingly, it is the principal object of the present invention to provide new and improved data handling systems which are highly efficient, have reduced cathode-ray tube replacement requirements, and provide very high contrast visual displays.

It is a further object of the present invention to provide a novel buffer store.

Figure 1:
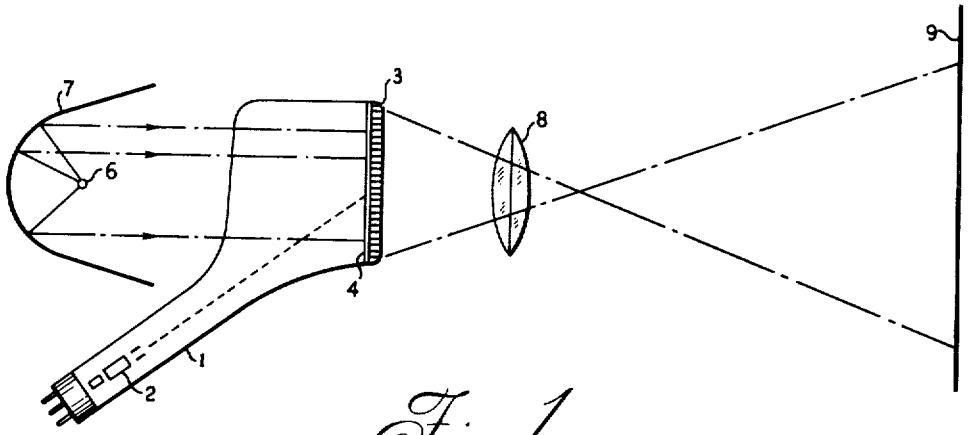

These and other objects and advantages of the present invention will become more apparent from the following detailed description, taken together with the accompanying drawing, in which:

FIG. 1 discloses a first embodiment of the present invention; and

Figure 2:
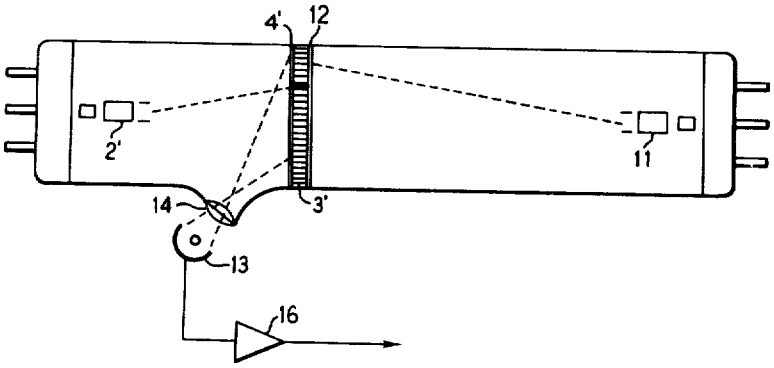

FIG. 2 discloses a second embodiment of the present invention.

In accordance with the present invention, a screen composed of a large number of parallel optical fibers or light pipes is coated with a phosphor which emits ultraviolet radiation when subjected to a stream of electrons. The optical fibers contain photochromic material besides the usual glass or transparent plastic material. *The optical fibers may be manufactured in any conventional manner, such as by the techniques described by N. S. Kapany in his article "Fiber Optics," Appendix N in the book "Concepts of Classical Optics," by John Strong, published by W. H. Freeman and Company in 1958, and by N. S. Kapany in his article "Fiber Optics, VI. Image Quality and Optical Insulation," Journal of the Optical Society of America, Vol. 49, Number 8, August 1959, pages 779–787.* A photochromic material, as is well known in the art, is a material that changes color or darkens as a result of the absorption of short wavelength electromagnetic energy, such as ultraviolet light. An absorption band is accordingly induced in the optical fibers so that these fibers that were originally transparent to lower frequency radiation, such as visible light, is rendered much less transparent or opaque to visible light. *Typical photochromic glasses are described by W. H. Armistead and S. D. Stookey in an article, "Photochromic Silicate Glasses Sensitized by Silver Halides," Science, Vol. 144, p. 150, Apr. 10, 1964, and by Alvin J. Cohen and Herbert L. Smith in an article, "Variable Transmission Silicate Glasses Sensitive to Sunlight," Science, Vol. 137, September 21, 1962.* With regard to the construction and fabrication of optical fibers which have photochromic properties, reference may be made to the article by D. S. Stookey entitled "Some Unusual Properties of Microcrystals in Glass," Scientific American, March 1964. It is also well known in the art that certain of these photochromic materials, such as alkali halides and silver halides, have reversible characteristics in this regard. In other words, the darkened areas or "F" centers induced within the photochromic material will be removed upon the passage of the lower frequency radiation, such as visible light therethrough. The screen is positioned within an evacuated tube and is exposed to relatively low frequency radiation, such as visible light. A first electron gun causes selected incremental areas of the ultraviolet phosphor to emit the higher frequency electromagnetic radiation, such as ultraviolet light, which in turn induces "F" centers or darkening of those optical fibers associated with the selected bombarded incremental areas of phosphor. Since the optical fibers have considerable length relative to the thickness of the aforementioned scotophor layer, the absorption of the incident visible light upon the screen is extremely efficient and a very high contrast display is produced. In the first embodiment of the present invention, a high contrast visual display is produced by simultaneously exposing the entire screen to the incident visible light radiation. In the second embodiment of the present invention, the screen is coated with a phosphor which is subjected to an electron stream emanating from a second electron gun. This produces a spot of visible light which scans the screen in raster fashion, or, for that matter, in any other manner. The first electron gun selectively darkens selected fibers as in the aforesaid first embodiment. A photocell positioned on the side of the screen opposite the second electron gun will produce binary signals during the scanning process which represent the image created by the first electron gun which originally excited various portions of the ultraviolet phosphor. As a result, a novel buffer store is provided.

In accordance with the foregoing, FIG. 1 discloses an evacuated tube 1 containing electron gun 2 and the aforesaid screen 3 coated with an ultraviolet phosphor 4. Light emanating from light source 6 is directed by a parabolic mirror 7 upon screen 3. In the absence of energization of the writing electron gun 2, all of the light emanating from source 6 will pass through screen 3, lens system 8, and will strike screen 9. The visual image is created by causing electron gun 2 to selectively darken certain of the optical fibers of screen 3 thereby to produce the high contrast visual image upon screen 9, as explained in detail hereinabove.

FIG. 2 discloses the second embodiment of the present invention. This embodiment may be utilized as a binary buffer store in addition to providing a visual image. Writing electron gun 2' subjects incremental areas of ultra-violet phosphor 4' to a stream of electrons, as in the embodiment of FIG. 1, thereby to darken selected optical fibers of screen 3'. An electron reading gun 11 is positioned as shown and sweeps phosphor layer 12 with an electron stream which in turn causes screen 3' to be subjected to a flying spot of light which is lower in frequency than the radiation emitted by phosphor layer 4'. The light generated by the flying spot will pass through those optical fibers which are not darkened by the aforementioned "F" centers and will be detected by photocell 13 positioned adjacent to lens 14. The darkened fibers could represent binary "zeros" and the undarkened fibers could represent binary "ones," or vice versa.

In most cases, the passage of light generated by phosphor layer 12 through the optical fibers or light pipes will cause the "F" centers to disappear so that the stored data is in effect erased upon being read out. The storage time may readily be altered by controlling the intensity of the electron stream generated by electron gun 11 or by selecting the appropriate photochromic material. Accordingly, the storage of data within the screen could be prolonged so that nondestructive readout results. In like manner, in the embodiment of FIG. 1, it may be desirable to cause the image written by electron gun 2 to be displayed for a considerable time period.

It should be also understood that by varying the intensity of all or some of the electron streams, the degree of absorption of the lower frequency radiation passing through the optical fibers may be closely controlled, so that images having various shades of gray, or other colors, may be created.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. In combination, a screen comprising a target electrode formed of a fiber optic element including a plurality of light pipes made of a composition containing a material which attenuates the transmission of electromagnetic radiation of a first frequency upon being exposed to electromagnetic radiation of a second frequency higher than said first frequency, reading means exposing said light pipes to said electromagnetic radiation of said first frequency for transmission therethrough, writing means for selectively causing certain of said light pipes to be exposed to said electromagnetic radiation of said second frequency to selectively cause electromagnetic radiations of said first frequency emanating from said reading means to be absorbed in said certain one of said light pipes while permitting said radiations to pass through the other light pipes, and output means for indicating which light pipes have absorbed said electromagnetic radiation of said first frequency to produce informational output signals.

2. The combination as set forth in claim 1 wherein said reading means includes means for simultaneously subjecting substantially all of said light pipes to said electromagnetic radiation of said first frequency.

3. The combination as set forth in claim 1 wherein said reading means includes means for scanning said screen with a spot of said electromagnetic radiation of a first frequency.

4. The combination as set forth in claim 1 wherein said writing means includes a coating of phosphor affixed to one surface of said target electrode for emitting electromagnetic radiation of said second frequency upon being subjected to a stream of electrons, and means for subjecting said phosphor coating to said stream of electrons.

5. The combination as set forth in claim 2 wherein said writing means includes a coating of phosphor affixed to a surface of said target electrode for emitting electromagnetic radiation of said second frequency upon being subjected to a stream of electrons, and means for subjecting said phosphor coating to said stream of electrons.

6. The combination as set forth in claim 3 wherein said writing means includes a coating of phosphor affixed to a surface of said target electrode for emitting electromagnetic radiation of said second frequency upon being subjected to a stream of electrons, and means for subjecting said phosphor coating to said stream of electrons.

7. A screen comprising a target electrode formed of a fiber optic element including a plurality of light pipes made of a composition containing a photochromic material which attenuates the transmission of electromagnetic radiation of a first frequency within the visible spectrum upon being exposed to electromagnetic radiation of a second frequency higher than said first frequency, reading means exposing said light pipes to said electromagnetic radiation of said first frequency within said visible spectrum for transmission therethrough, writing means for selectively causing certain ones of said light pipes to be exposed to said electromagnetic radiation of said second frequency to selectively cause electromagnetic radiations of said first frequency emanating from said reading means to be absorbed in said certain ones of said light pipes while permitting said radiations to pass through the other light pipes, and output means for indicating which light pipes have absorbed said electromagnetic radiation of said first frequency to produce informational output signals.

8. A screen including a plurality of light pipes containing a photochromic material which attenuates the transmission of visible light upon being exposed to ultraviolet light, reading means for exposing said light pipes to said visible light, writing means for selectively causing certain ones of said light pipes to be exposed to said ultraviolet light to selectively cause visible light emanating from said reading means to be absorbed in said certain ones of said light pipes, and output means for indicating which light pipes have absorbed said visible light to produce a visible image.

9. The combination as set forth in claim 8 wherein said reading means includes means for simultaneously subjecting substantially all of said light pipes to said visible light.

10. The combination as set forth in claim 8 wherein said reading means includes means for scanning said screen with a spot of said visible light.

11. The combination as set forth in claim 8 wherein said writing means includes a coating of phosphor affixed to one surface of said target electrode for emitting ultraviolet light upon being subjected to a stream of electrons, and means for subjecting said phosphor coating to said stream of electrons.

12. The combination as set forth in claim 9 wherein said writing means includes a coating of phosphor affixed to one surface of said target electrode for emitting electromagnetic radiation of said second frequency upon being bombarded by a stream of electrons, and means for subjecting said phosphor coating to said stream of electrons.

13. The combination as set forth in claim 10 wherein said writing means includes a coating of phosphor affixed to one surface of said target electrode for emitting electromagnetic radiation of said second frequency upon being subjected to a stream of electrons, and means for subjecting said phosphor coating to said stream of electrons.

* * * * *

UNITED STATES PATENT OFFICE

CERTIFICATE OF CORRECTION

PATENT NO. : RE 28630

DATED : November 25, 1975

INVENTOR(S) : Omer F. Haman

It is certified that error appears in the above-identified patent and that said Letters Patent are hereby corrected as shown below:

Column 2, line 6, before "With" insert a heavy open bracket,

Column 2, line 11, after "1964." insert a heavy close bracket.

Signed and Sealed this

*sixth* Day of *April 1976*

[SEAL]

*Attest:*

RUTH C. MASON
*Attesting Officer*

C. MARSHALL DANN
*Commissioner of Patents and Trademarks*